United States Patent
Gallagher et al.

(10) Patent No.: US 7,390,586 B2
(45) Date of Patent: Jun. 24, 2008

(54) FUEL CELL STACKS OF ALTERNATING POLARITY MEMBRANE ELECTRODE ASSEMBLIES

(75) Inventors: Emerson R Gallagher, Vancouver (CA); Maura H Malone, Vancouver (CA)

(73) Assignee: Ballard Power Systems, Inc., Burnaby (CA)

( * ) Notice: Subject to any disclaimer, the term of this patent is extended or adjusted under 35 U.S.C. 154(b) by 814 days.

(21) Appl. No.: 10/798,714

(22) Filed: Mar. 10, 2004

(65) Prior Publication Data

US 2005/0202294 A1    Sep. 15, 2005
US 2006/0199054 A9    Sep. 7, 2006

(51) Int. Cl.
*H01M 8/04*    (2006.01)
*H01M 8/24*    (2006.01)

(52) U.S. Cl. .............................. 429/26; 429/32; 429/39

(58) Field of Classification Search ........................ None
See application file for complete search history.

(56) References Cited

U.S. PATENT DOCUMENTS

| | | | |
|---|---|---|---|
| 5,709,961 A | 1/1998 | Cisar et al. | 429/32 |
| 2002/0068215 A1* | 6/2002 | Hamada et al. | 429/42 |
| 2002/0076582 A1 | 6/2002 | Reiser et al. | 429/13 |
| 2002/0076583 A1 | 6/2002 | Reiser et al. | 429/13 |
| 2004/0001981 A1 | 1/2004 | Resnick et al. | 429/13 |
| 2005/0058865 A1* | 3/2005 | Thompson et al. | 429/26 |
| 2007/0248847 A1 | 10/2007 | Haas et al. | |

FOREIGN PATENT DOCUMENTS

| | | | |
|---|---|---|---|
| JP | 02-027670 | * | 1/1990 |
| WO | 2005/029617 A2 | | 3/2005 |

\* cited by examiner

*Primary Examiner*—Jonathan S Crepeau
(74) *Attorney, Agent, or Firm*—Crowell & Moring LLP (57) ABSTRACT

Electrochemical fuel cell stacks comprising a plurality of membrane electrode assemblies stacked in an alternating manner, such that the polarity of adjacent membrane electrode assemblies are opposite, are disclosed. The fuel cell stacks comprise a plurality of membrane electrode assemblies, each membrane electrode assembly comprising an anode fluid distribution layer, a cathode fluid distribution layer, a polymer electrolyte membrane interposed between the anode and cathode fluid distribution layers, an anode electrocatalyst layer interposed between the polymer electrolyte membrane and the anode fluid distribution layer, and a cathode electrocatalyst interposed between the polymer electrolyte membrane and the cathode fluid distribution layer, wherein the plurality of membrane electrode assemblies are stacked in an alternating manner such that the polarity of adjacent membrane electrode assemblies are opposite, and wherein the plurality of membrane electrode assemblies are externally jumpered. Methods for shutting down the fuel cell stacks are also disclosed.

4 Claims, 7 Drawing Sheets

FUEL CELL STACKS OF ALTERNATING POLARITY MEMBRANE ELECTRODE ASSEMBLIES

BACKGROUND OF THE INVENTION

1. Field of the Invention

This invention relates generally to electrochemical fuel cell stacks. More specifically, the present invention relates to electrochemical fuel cell stacks comprising a plurality of membrane electrode assemblies stacked in an alternating manner such that the polarity of adjacent membrane electrode assemblies are opposite.

2. Description of the Related Art

Fuel cell systems are currently being developed for use as power supplies in a wide variety of applications, such as automobiles and stationary power plants. Such systems offer the promise of economically delivering power while providing environmental and other benefits.

Fuel cells convert reactants, namely, fuel and oxidant, to generate electric power and reaction products. Fuel cells generally employ an electrolyte disposed between two electrodes, namely a cathode and an anode. A catalyst typically induces the desired electrochemical reactions at the electrodes. Fuel cell types include, for example, alkaline fuel cells and solid polymer electrolyte (SPE) fuel cells, which comprise a solid polymer electrolyte and operate at relatively low temperatures.

SPE fuel cells employ a membrane electrode assembly (MEA), which comprises the solid polymer electrolyte or ion-exchange membrane disposed between the two electrodes. Each electrode contains a catalyst layer, comprising an appropriate catalyst for facilitating the desired electrochemical reaction of the fuel and oxidant, located adjacent to the solid polymer electrolyte membrane. The catalyst is typically a precious metal composition (e.g., platinum metal black or an alloy thereof) and may be provided on a suitable support (e.g., fine platinum particles supported on a carbon black support). The catalyst layers may contain an ionomer similar to that used for the solid polymer electrolyte membrane (e.g., Nafion®). The electrodes may also contain a porous, electrically conductive substrate that may be employed for purposes of mechanical support, electrical conduction, and/or reactant distribution, thus serving as a fluid diffusion or distribution layer.

In electrochemical fuel cells, the MEA is typically interposed between two substantially fluid impermeable separator plates (anode and cathode plates). The plates typically act as current collectors and provide support to the MEA. In addition, the plates may have reactant channels formed therein and act as flow field plates providing access of the fuel and oxidant to the porous anode and cathode substrates, respectively, and providing for the removal of product water formed during operation of the cells. Typically, a plurality of inlet ports, supply manifolds, exhaust manifolds and outlet ports direct the fuel and oxidant to, and the exhaust products from, the reactant channels in these flow field plates. The supply and exhaust manifolds may be internal manifolds, which extend through aligned openings formed in the flow field plates and MEAs, or may comprise external or edge manifolds, attached to the edges of the flow field plates.

A broad range of reactants can be used in SPE fuel cells. For example, the fuel stream may be substantially pure hydrogen gas, a gaseous hydrogen-containing reformate stream, or methanol in a direct methanol fuel cell. The oxidant may be, for example, substantially pure oxygen or a dilute oxygen stream such as air.

During normal operation of a SPE fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The electrons travel through an external circuit providing useable power and then react with the protons and oxidant at the cathode catalyst to generate water reaction product.

In operation, the output voltage of an individual fuel cell under load is generally below one volt. Therefore, in order to provide greater output voltage, multiple cells are usually stacked together (anode to cathode) and are connected in series to create a higher voltage fuel cell stack. End plate assemblies are placed at each end of the stack to hold the stack together and to compress the stack components together, thereby sealing and providing adequate electrical contact between various stack components. Fuel cell stacks can be further connected in series and/or parallel combinations to form larger arrays for delivering higher voltages and/or currents.

Although there have been advances in the field, there remains a need for improved fuel cell stack designs which are both economical and simple to manufacture. The present invention addresses these needs and provides further related advantages.

BRIEF SUMMARY OF THE INVENTION

In brief, the present invention relates to electrochemical fuel cell stacks comprising a plurality of membrane electrode assemblies stacked in an alternating manner such that the polarity of adjacent membrane electrode assemblies are opposite.

More specifically, a fuel cell stack is provided that comprises a plurality of membrane electrode assemblies, each membrane electrode assembly comprising an anode fluid distribution layer, a cathode fluid distribution layer, a polymer electrolyte membrane interposed between the anode and cathode fluid distribution layers, an anode electrocatalyst layer interposed between the polymer electrolyte membrane and the anode fluid distribution layer, and a cathode electrocatalyst interposed between the polymer electrolyte membrane and the cathode fluid distribution layer, wherein the plurality of membrane electrode assemblies are stacked in an alternating manner such that the polarity of adjacent membrane electrode assemblies are opposite, and wherein the plurality of membrane electrode assemblies are externally jumpered (that is, the assemblies are electrically connected to each other via connections that are external to the stack).

In one embodiment, the fuel cell stack further comprises a plurality of electrically insulating spacers interposed between, and configured to allow fluid access to, opposing faces of adjacent membrane electrode assemblies.

In a more specific embodiment of the foregoing, for each membrane electrode assembly, the anode fluid distribution layer is externally jumpered to the cathode fluid distribution layer in a first of the two adjacent membrane electrode assemblies and the cathode fluid distribution layer is externally jumpered to the anode fluid distribution layer in a second of the two adjacent membrane electrode assemblies.

In further more specific embodiments, for each membrane electrode assembly, a protruding edge of the anode fluid distribution layer is connected to a protruding edge of the cathode fluid distribution layer in the first adjacent membrane electrode assembly and a protruding edge of the cathode fluid distribution layer is connected to a protruding edge of the anode fluid distribution layer in the second adjacent membrane electrode assembly. In addition, the protruding edges of the anode and cathode fluid distribution layers may be fluid impermeable and may either comprise an electrically conductive material having a high in-plane conductivity or have a plurality of electrically conductive elements disposed therein to impart a high in-plane conductivity to the anode and cathode fluid distribution layers.

In an alternate embodiment, the fuel cell stack further comprises a plurality of electrically conductive anode flow field plates arranged such that an anode flow field plate is interposed between opposing faces of adjacent membrane electrode assemblies having facing anode fluid distribution layers, a plurality of electrically conductive cathode flow field plates arranged such that a pair of cathode flow field plates is interposed between opposing faces of adjacent membrane electrode assemblies having facing cathode fluid distribution layers, and a plurality of electrically insulating coolant flow field plates arranged such that a coolant flow field plate is interposed between each pair of cathode flow field plates interposed between opposing faces of adjacent membrane electrode assemblies having facing cathode fluid distribution layers, such that the fuel cell stack comprises a plurality of repeating units, each repeating unit comprising, in the following order, a first cathode flow field plate, a first membrane electrode assembly, an anode flow field plate, a second membrane electrode assembly and a second cathode flow field plate, and each repeating unit being interposed between two coolant flow field plates.

In a more specific embodiment of the foregoing, the anode flow field plate of each repeating unit is externally jumpered to both the first and second cathode flow field plates of an adjacent repeating unit.

Methods for shutting down the fuel cell stacks of the present invention are also disclosed.

These and other aspects of the invention will be apparent upon reference to the attached figures and following detailed description.

DETAILED DESCRIPTION OF THE INVENTION

Figure 1:
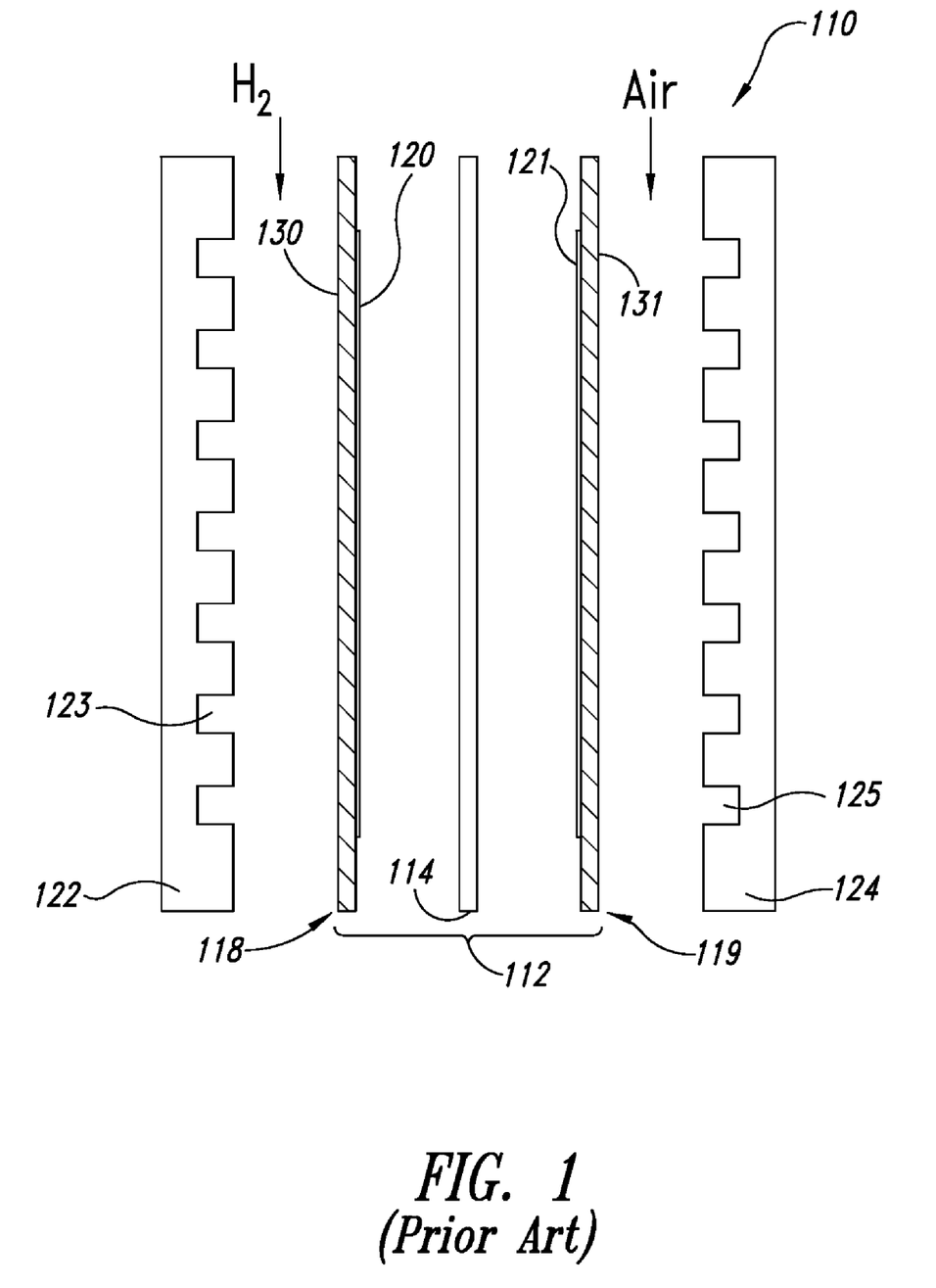
FIG. 1 is an exploded sectional view of a conventional electrochemical fuel cell.

FIG. 1 illustrates a conventional fuel cell 110. Fuel cell 110 includes a membrane electrode assembly 112 interposed between anode flow field plate 122 and cathode flow field plate 124. Membrane electrode assembly 112 comprises a polymer electrolyte membrane 114 interposed between two electrodes, namely, anode 118 and cathode 119. In conventional fuel cells, anode 118 and cathode 119 each comprise a gas diffusion layer (i.e., a fluid distribution layer of porous electrically conductive sheet material) 130 and 131, respectively. Each fluid distribution layer has a thin layer of electrocatalyst 120 and 121, such as platinum black or a carbon-supported platinum catalyst, disposed on the surface thereof at the interface with membrane 114 to render each electrode electrochemically active. Anode flow field plate 122 has at least one anode flow field channel 123 formed in its surface facing anode fluid distribution layer 130. Similarly, cathode flow field plate 124 has at least one cathode flow field channel 125 formed in its surface facing cathode fluid distribution layer 131. When assembled against the cooperating surfaces of fluid distribution layers 130 and 131, channels 123 and 125 form reactant flow field passages for the fuel and oxidant, respectively, or the fuel and the oxidant/coolant, respectively, in a combined oxidant-coolant fuel cell.

In a conventional fuel cell stack, a plurality of fuel cells 110 are arranged in series, such that, with respect to a single fuel cell 110, anode flow field plate 122 is adjacent to the cathode flow field plate 124 of one of the two adjacent fuel cells 110 and cathode flow field plate 124 is adjacent to the anode flow field plate 122 of the other adjacent fuel cell 110 (i.e., anode 118 faces the cathode 119 of one adjacent fuel cell 110 and cathode 119 faces the anode 118 of the other adjacent fuel cell 110). Alternatively, rather than having two flow field plates between adjacent membrane electrode assemblies 112, the fuel cell stack may comprise a plurality of bipolar flow field plates (not shown) between adjacent membrane electrode assemblies 112. In such stacks, channels on one side of the bipolar flow field plate function as the anode flow field channels for, and carry fuel to, the anode 118 of one of the adjacent membrane electrode assemblies 112, while channels on the other side of the plate serve as the cathode flow field channels for, and carry oxidant to, the cathode 119 of the other adjacent membrane electrode assembly 112. In both configurations, the flow field plates are electrically conductive and cooperate with the electrically conductive fluid distribution layers to conduct current through the fuel cell stack.

As noted above, the present invention is directed to electrochemical fuel cell stacks comprising a plurality of membrane electrode assemblies stacked in an alternating manner such that the polarity of adjacent membrane electrode assemblies are opposite. In such a fuel cell stack, unlike in a conventional stack, the membrane electrode assemblies are arranged such that, with respect to a single membrane electrode assembly, the anode is facing the anode of one of the two adjacent membrane electrode assemblies and the cathode is facing the cathode of the other adjacent membrane electrode assembly. In addition, rather than employing electrically conductive flow field plates to conduct current directly between adjacent membrane electrode assemblies as in a conventional stack, the individual membrane electrode assemblies are externally jumpered to provide for the conduction of current through the stack.

Figure 2:
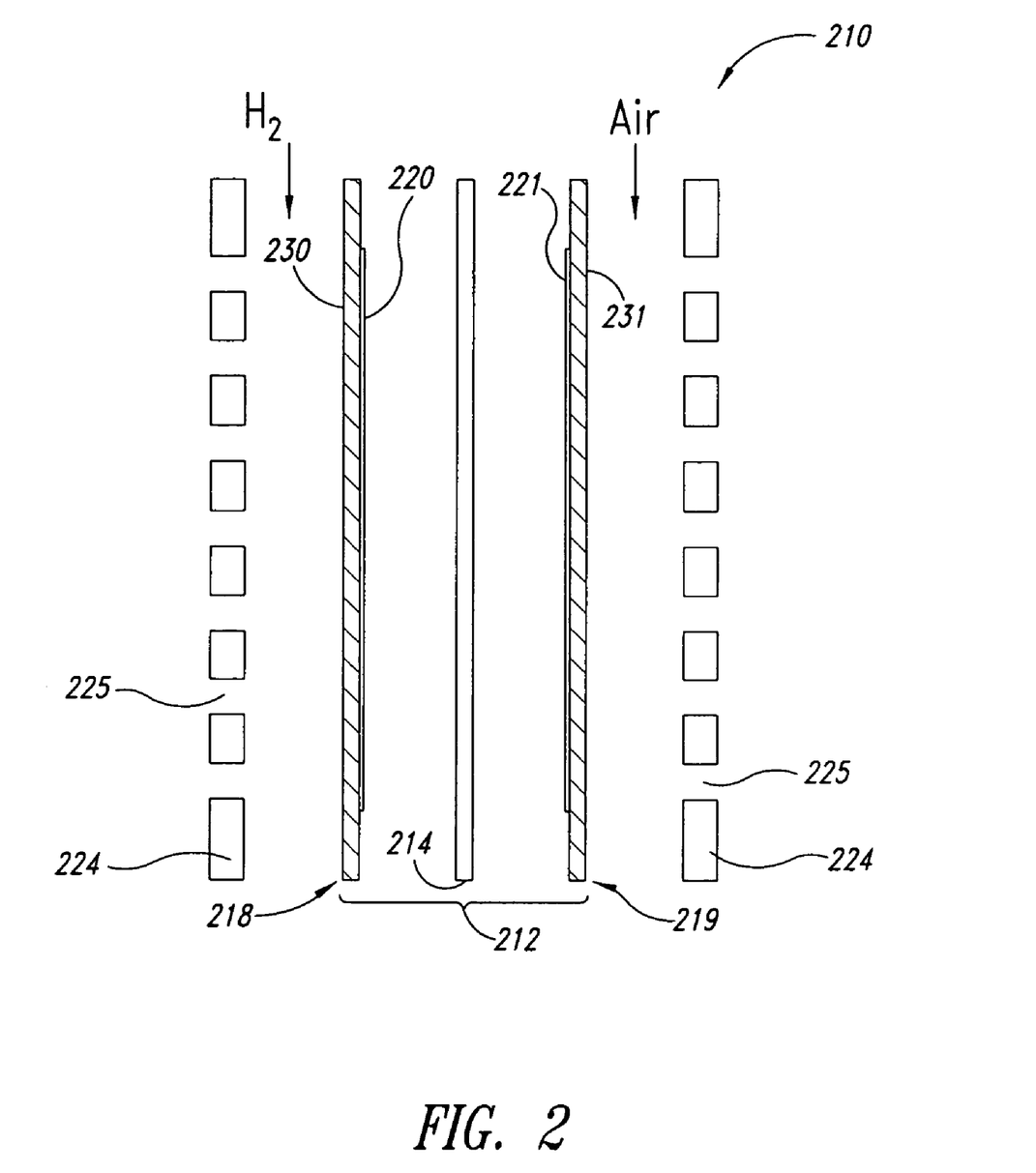
FIG. 2 is an exploded sectional view of a representative electrochemical fuel cell of one embodiment of the fuel cell stack of the present invention.

FIG. 2 illustrates a representative fuel cell 210 of one embodiment of the fuel cell stack of the present invention. As in FIG. 1, fuel cell 210 includes a membrane electrode assembly 212 comprising a polymer electrolyte membrane 214 interposed between two electrodes, namely, anode 218 and cathode 219. Also as in FIG. 1, anode 218 and cathode 219 each comprise a gas diffusion layer (i.e., a fluid distribution layer of porous electrically conductive sheet material) 230 and 231, respectively, having a thin layer of electrocatalyst 220 and 221, such as platinum black or a carbon-supported platinum catalyst, disposed on the surfaces thereof at the interface with membrane 214 to render each electrode electrochemically active.

As shown in FIG. 2, rather than being interposed between two flow field plates, fuel cell 210 has a plurality of electrically insulating spacers 224 adjacent to the surfaces of anode fluid distribution layer 230 and cathode fluid distribution layer 231 opposite membrane 214. Spacers 224 may be an expanded mesh or an array of rods or the like that are made from a suitable polymeric material. When assembled against the surfaces of fluid distribution layers 230 and 231, areas 225 between spacers 224 allow for access of the fuel and oxidant to the surfaces of the anode and cathode fluid distribution layers, respectively.

Figure 3A:
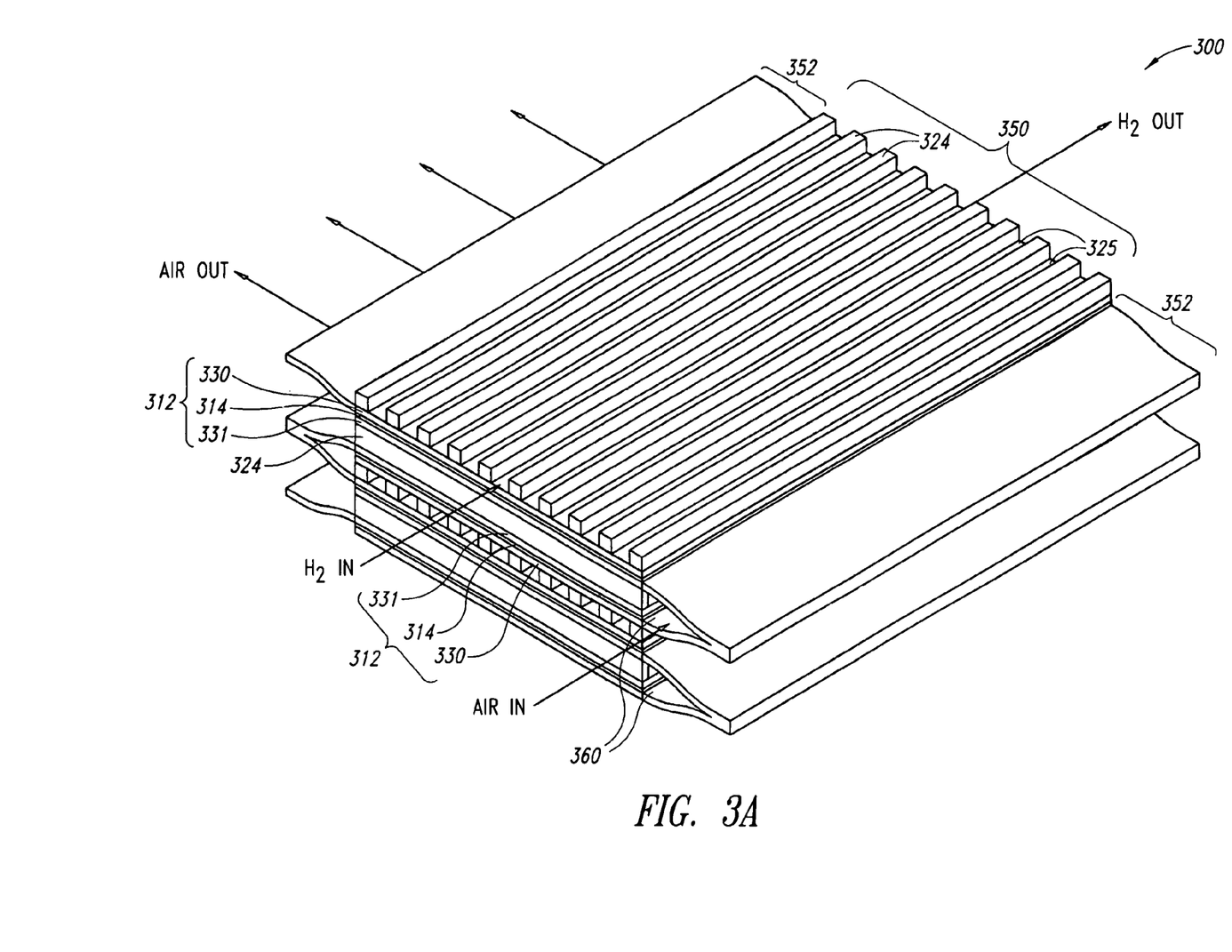
FIGS. 3A and 3B are three-dimensional partial sectional views of one embodiment of the electrochemical fuel cell stack of the present invention.
Figure 3B:
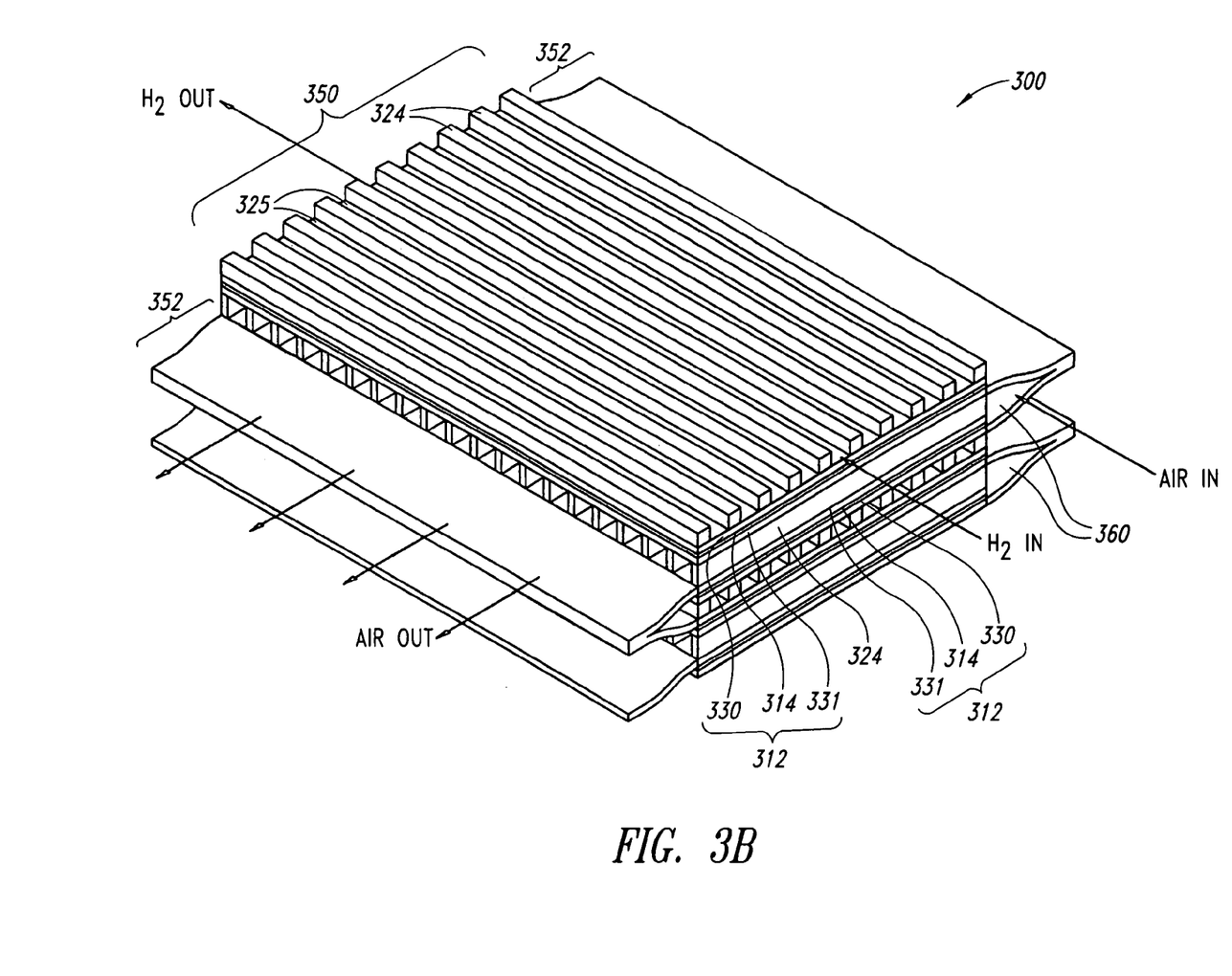

FIGS. 3A and 3B illustrate a representative fuel cell stack 300 of one embodiment of the present invention comprising a plurality of the fuel cells 210 of FIG. 2. As shown in FIGS. 3A and 3B, a plurality of membrane electrode assemblies 312 are stacked in an alternating manner, such that, with respect to a single membrane electrode assembly 312, anode fluid distribution layer 330 is facing the anode fluid distribution layer 330 of one of the two adjacent membrane electrode assemblies 312 and cathode fluid distribution layer 331 is facing the cathode fluid distribution layer 331 of the other adjacent membrane electrode assembly 312. As in FIG. 2, anode and cathode fluid distribution layers 330 and 331 of each membrane electrode assembly 312 have a thin layer of electrocatalyst (not specifically shown), such as platinum black or a carbon-supported platinum catalyst, disposed on the surfaces thereof at the interface with membrane 314, to render each electrode electrochemically active in an electrochemically active area 350.

As further shown in FIGS. 3A and 3B, rather than employing conventional flow field plates, a plurality of electrically insulating spacers 324 are interposed between opposing faces of adjacent membrane electrode assemblies 312 in fuel cell stack 300. Spacers 324 are configured to electrically insulate adjacent membrane electrode assemblies 312 from each other, while allowing for fluid access through areas 325 to the surfaces of the two facing fluid distribution layers. As illustrated, spacers 324 are rectangular in shape and form a plurality of channels across the surfaces of facing fluid distribution layers, however, the shape of spacers 324 is not essential to the present invention, and persons of ordinary skill in the art can readily select a suitable shape for a given application.

As noted above, in the fuel cell stacks of the present invention, such as fuel cell stack 300 of FIGS. 3A and 3B, rather than conducting current directly between the electrochemically active areas of adjacent membrane electrode assemblies, the individual membrane electrode assemblies are externally jumpered to provide for the conduction of current around the electrochemically active areas and through the stack. For example, in the embodiment illustrated in FIGS. 3A and 3B, anode fluid distribution layer 330 of each membrane electrode assembly 312 is externally jumpered to the cathode fluid distribution layer 331 in one (i.e., a first) of the two adjacent membrane electrode assemblies 312 and cathode fluid distribution layer 331 of each membrane electrode assembly 312 is externally jumpered to the anode fluid distribution layer 330 in the other (i.e., a second) of the two adjacent membrane electrode assemblies 312. More specifically, and as shown in FIGS. 3A and 3B, (i) a protruding edge 352 of anode fluid distribution layer 330 is connected to a protruding edge 352 of the cathode fluid distribution layer 331 in the first adjacent membrane electrode assembly 312 and (ii) a protruding edge 352 of cathode fluid distribution layer 331 is connected to a protruding edge 352 of the anode fluid distribution layer 330 in the second adjacent membrane electrode assembly 312.

In such an embodiment, anode and cathode fluid distribution layers 330 and 331 are configured to have a high in-plane electrical conductivity, thereby enabling current to be conducted between adjacent membrane electrode assemblies through the foregoing external connections. For example, anode and cathode fluid distribution layers 330 and 331 may comprise an electrically conductive material having a high in-plane conductivity or may have a plurality of electrically conductive elements (such as metallic wire or mesh, densified flexible graphite, carbon nanotubes or highly oriented pyrolytic graphite or graphite whiskers) disposed therein and arranged to impart a high in-plane conductivity to the fluid distribution layers.

Figure 3C:
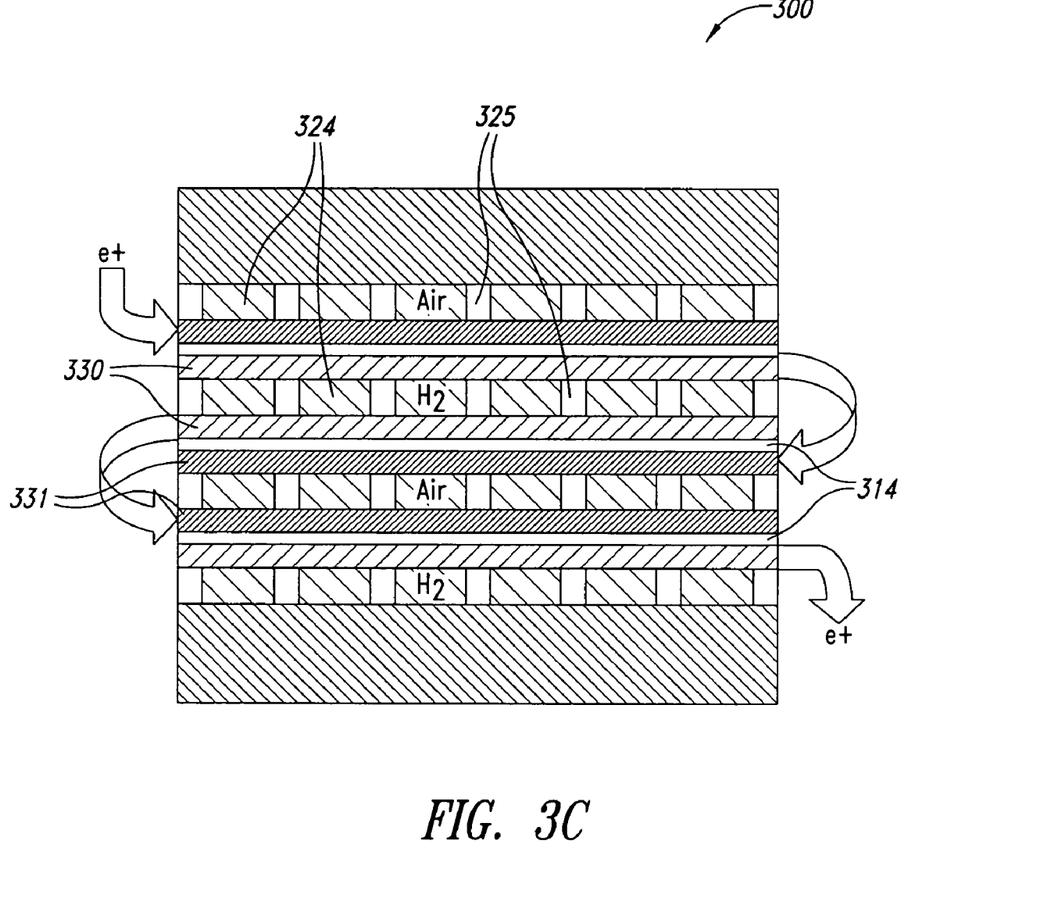
FIG. 3C is a schematic sectional view of one embodiment of the electrochemical fuel cell stack of the present invention.

During operation, and as further shown in FIG. 3C, fuel and oxidant (e.g., hydrogen and air) are introduced into areas 325 between facing anode and cathode fluid distribution layers 330 and 331, respectively. For purposes of illustration (i.e., to show areas 325), FIG. 3C shows spacers 324 between facing anode fluid distribution layers 330 as being parallel to spacers 324 between facing cathode fluid distribution layers 331. However, as shown in FIGS. 3A and 3B, when assembled into fuel cell stack 300, spacers 324 between facing anode fluid distribution layers 330 are, in fact, arranged perpendicular to spacers 324 between facing cathode fluid distribution layers 331.

With respect to each membrane electrode assembly 312, fuel diffuses through the anode fluid distribution layer 330 and is electrochemically oxidized at the anode electrocatalyst (not specifically shown). With reference again to FIGS. 3A and 3B, the electrons generated by this reaction travel through (i) the electrochemically active area 350 of the anode fluid distribution layer 330, (ii) the protruding edge 352 of the anode fluid distribution layer 330, (iii) the protruding edge 352 of the cathode fluid distribution layer 331 in a first of the two adjacent membrane electrode assemblies, and (iv) the electrochemically active area 352 of the cathode fluid distribution layer 331 in the first adjacent membrane electrode assembly, to electrochemically react with the oxidant at the cathode electrocatalyst in the first adjacent membrane electrode assembly.

As will be appreciated from the foregoing description, by alternating the polarity of, and externally jumpering, adjacent membrane electrode assemblies, the embodiment of the fuel cell stack of present invention illustrated in FIGS. 3A and 3B permits conventional flow field plates to be replaced by simple and inexpensive electrically insulating spacers. Such an approach can offer a possible reduction in stack volume and can allow for other unconventional but desirable features to be adopted in the stack construction as illustrated below.

In addition, as further shown in FIGS. 3A and 3B, if protruding edges 352 of anode and cathode fluid distribution layers 330 and 331 are rendered fluid impermeable (e.g., by laminating, coating, or impregnating the porous edges), such protruding edges may be used as part of the supply and exhaust manifold system for the fuel cell stack. For example, as shown in FIGS. 3A and 3B, a reactant fluid (e.g., oxidant or air) may be directed into the enclosed passages 360 formed between pairs of connected protruding edges 352. As further shown, such passages 360 feed into areas 325 between facing anode and cathode fluid distribution layers 330 and 331 and, in this way, may be utilized to direct reactant fluids to areas 325.

Figure 4:
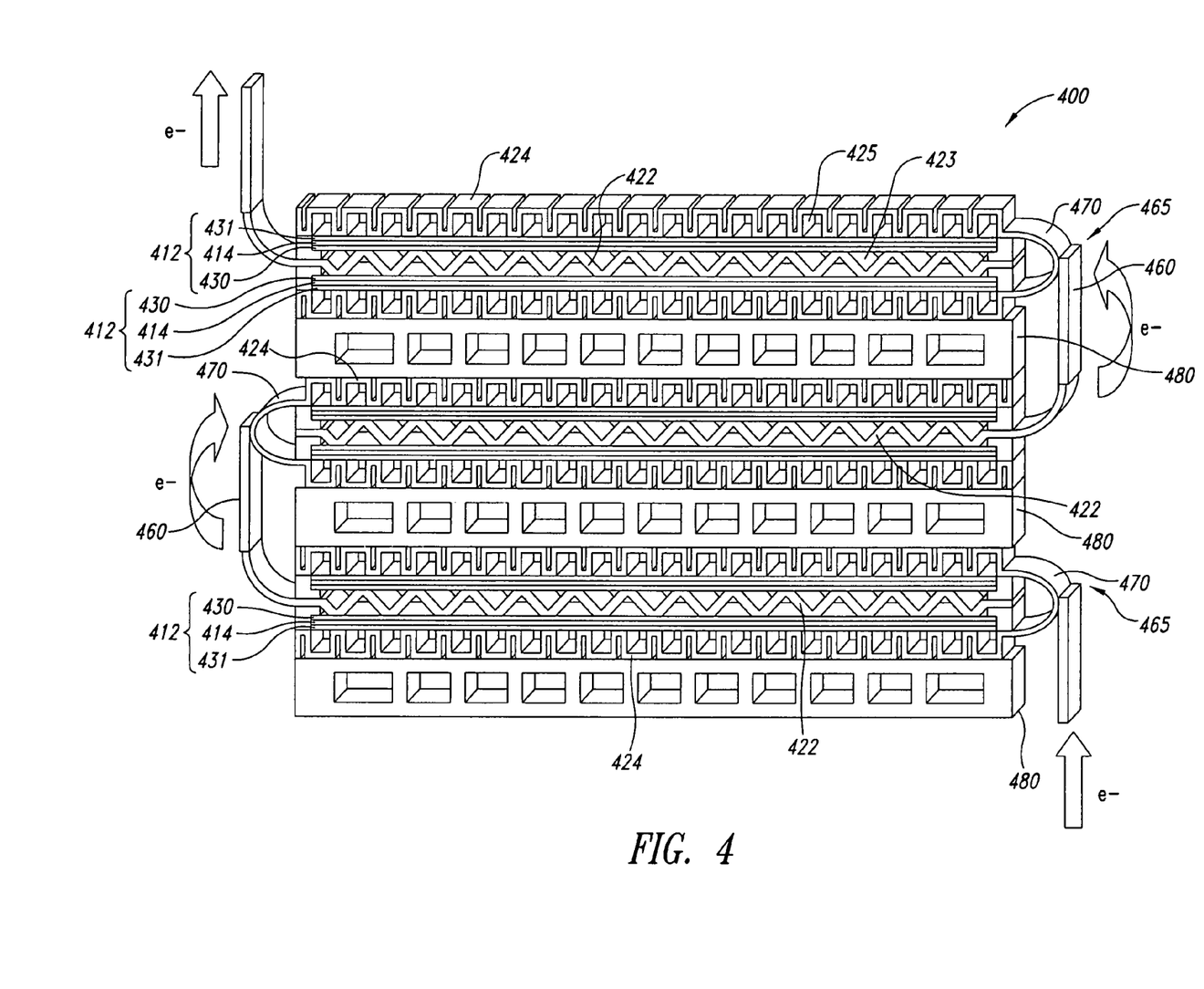
FIG. 4 is a partial sectional view of a second embodiment of the electrochemical fuel cell stack of the present invention.

A representative fuel cell stack 400 of a second embodiment of the present invention is illustrated in FIG. 4. As in fuel cell stack 300 of FIGS. 3A and 3B, in fuel cell stack 400 comprising a plurality of membrane electrode assemblies 412 stacked in an alternating manner, such that, with respect to a single membrane electrode assembly 412, anode fluid distribution layer 430 is facing the anode fluid distribution layer 430 of one of the two adjacent membrane electrode assemblies 412 and cathode fluid distribution layer 431 is facing the cathode fluid distribution layer 431 of the other adjacent membrane electrode assembly 412. In addition, anode and cathode fluid distribution layers 430 and 431 of each membrane electrode assembly 412 have a thin layer of electrocatalyst (not specifically shown), such as platinum black or a carbon-supported platinum catalyst, disposed on the surfaces thereof at the interface with membrane 414, to render each electrode electrochemically active.

As further shown in FIG. 4, rather than utilizing a plurality of electrically insulating spacers as in fuel cell stack 300, fuel cell stack 400 comprises a plurality of electrically conductive reactant flow field plates and electrically insulating coolant flow field plates to electrically insulate adjacent membrane electrode assemblies 412 from each other and allow for fluid access to the surfaces of the anode and cathode fluid distribution layers 430 and 431. As illustrated, a plurality of double-sided electrically conductive anode flow field plates 422 are arranged such that one anode flow field plate 422 is interposed between opposing faces of adjacent membrane electrode assemblies 412 having facing anode fluid distribution layers 430. In addition, a plurality of electrically conductive cathode flow field plates 424 are arranged such that a pair of cathode flow field plates 424 is interposed between opposing faces of adjacent membrane electrode assemblies 412 having facing cathode fluid distribution layers 431, and a plurality of electrically insulating coolant flow field plates 480 are arranged such that a coolant flow field plate 480 is interposed between each pair of cathode flow field plates 424.

In this way, fuel cell stack 400 comprises a plurality of repeating units, each repeating unit comprising, in the following order, a first cathode flow field plate 424, a first membrane electrode assembly 412, an anode flow field plate 422, a second membrane electrode assembly 412 and a second cathode flow field plate 424, and each repeating unit being interposed between two coolant flow field plates 480.

As illustrated in FIG. 4, to provide for the conduction of current through fuel cell stack 400, the anode flow field plate 422 of each repeating unit is externally jumpered to both the first and second cathode flow field plates 424 of an adjacent repeating unit. More specifically, and as further shown, each pair of cathode flow field plates 424 are externally connected to each other via connectors 470 (or alternatively each combination of a pair of cathode flow field plates 424 and a connector 470 may be formed as one folded over unit) and each anode flow field plate 422 is connected to a jumper tab 460. Connectors 470 and jumper tabs 460 are joined (e.g., by welding, brazing, soldering, crimping, etc . . . ) at jumper points 465 and current (i.e., electrons generated at the anode electrocatalysts) is routed through fuel cell stack 400 as shown in FIG. 4.

In such an embodiment, anode and cathode flow field plates 422 and 424 are configured to have a high in-plane electrical conductivity, thereby enabling current to be conducted between adjacent membrane electrode assemblies through the foregoing external connections. Anode and cathode flow field plates 422 and 424 may be fabricated from, for example, conductive metallic compositions (e.g., 316 L stainless steel with a gold coating or the like for protection against corrosion). In addition, as shown in FIG. 4, anode and cathode flow field plates 422 and 424 are formed to provide a plurality of anode and cathode flow field channels 423 and 425, respectively, when assembled in fuel cell stack 400.

Figure 5A:
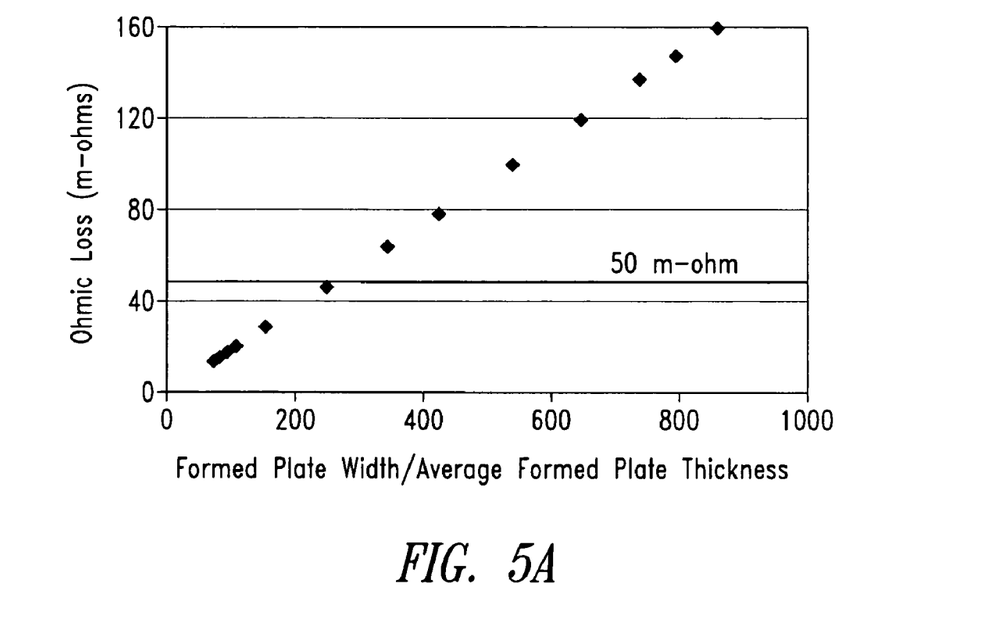
FIGS. 5A and 5B are graphs showing the relationship between the formed plate width, original plate width, average plate thickness and the associated average ohmic loss for the embodiment of FIG. 4 with 316 L stainless steel plates.
Figure 5B:
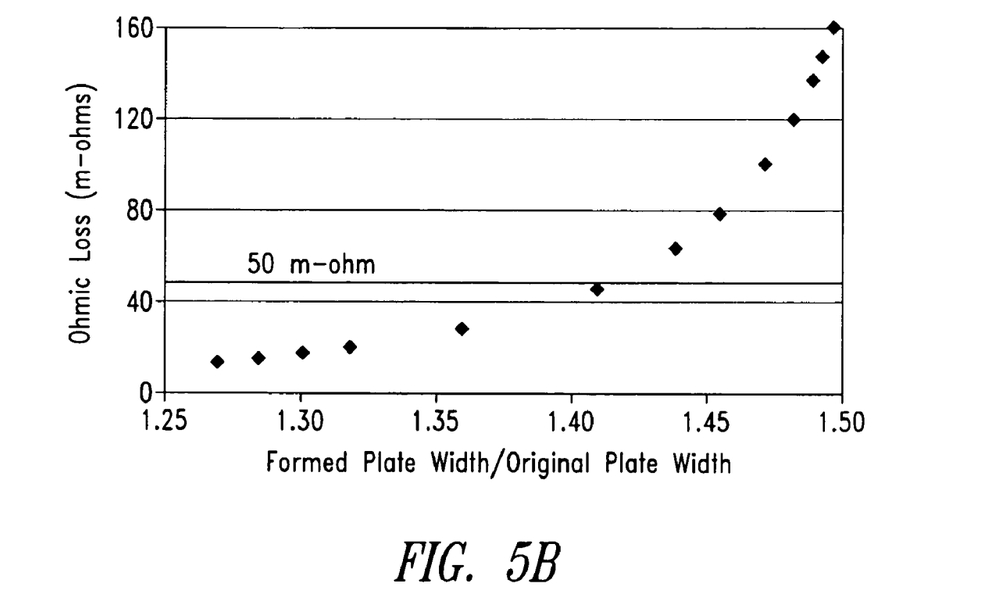

Since current is carried through the plane of flow field plates 422 and 424 (as opposed to normal to the plane of the plates, as in a conventional fuel cell stack), fuel cell stack 400 may be subject to resistive losses associated with such in-plane current movement. With respect to a given flow field plate, such resistive losses are a function of both the width (i.e., the actual distance an electron must travel through the plane of the plate) and the average thickness of the plate, and may be readily calculated by one of ordinary skill in the art. For instance, if the flow field plates are stamped or formed metal plates, an increase in the depth of the flow field channels results in both an increase in the formed width of the plate and a decrease in the average thickness of the plate. FIGS. 5A and 5B illustrate the relationship between the formed plate width, original plate width (before forming), average formed plate thickness and the associated average ohmic loss for representative formed metal plates made of 316 L stainless steel (where the average ohmic loss has been taken to be half the resistance over the formed plate width). As shown, as the ratios of (i) the formed plate width to the average formed plate thickness and (ii) the formed plate width to the original plate width increase, the associate average ohmic losses increase. Typically, in fuel cell stacks of the present invention, the resistive losses (i.e., average ohmic loss) are less than about 50 m-ohms and the ratios of formed plate width to average formed plate thickness is less than about 250.

As will be appreciated from the foregoing description, since current is conducted around coolant flow field plates 480, any coolant fluids flowing therein will be electrically isolated from other stack components. As a result, unlike in conventional fuel cell stacks, which require the use of a de-ionized coolant (such as a de-ionized water/ethylene glycol mixture) since the coolant may come into contact with the other stack components at widely differing potentials, the use of a de-ionized coolant is not required in the fuel cell stack of FIG. 4.

In addition, since jumper points 465 are outside of the electrochemically active area of fuel cell stack 400, the connection between connectors 470 and jumper tabs 460 are less prone to corrosion. Further, the coating integrity requirements for coated metallic flow field plates are lower and the risk of a property change due to heat affected zone around the weld is reduced. Also, this configuration may allow the use of dissimilar materials for the anode versus the cathode plate.

As set forth above, the present invention is also directed to methods for shutting down the fuel cell stacks of the present invention. More specifically, the fuel cell stacks of the present invention may be shut down according to the methods for obtaining improved water distribution within fuel cell stacks disclosed in co-pending U.S. patent application Ser. No. 10/661,093, filed Sep. 12, 2003, which application is assigned to the assignee of the present invention and is hereby incorporated by reference in its entirety.

As noted in the '093 application, in many applications, a fuel cell stack may frequently be stopped and re-started, often with significant storage periods in between. As a result of this cyclic use, problems may arise relating to the water content remaining in, and its distribution through, the fuel cell stack. For instance, liquid water accumulations in the fuel cell stack following shutdown may adversely affect cell performance by blocking the flow of reactants upon re-start of the stack. Perhaps even worse, if the fuel cell stack is stored at below freezing temperatures, liquid water accumulations in the cells may freeze, thereby possibly resulting in permanent damage to the cells. On the other hand, with too little water remaining, the conductivity of the polymer electrolyte membrane may be substantially reduced, resulting in poor power capability upon re-start of the stack.

As disclosed in the '093 application, it has been discovered that a desirable water distribution can be obtained in a fuel cell stack during, and following, shutdown by ensuring that an appropriate temperature difference is maintained across the cells in the stack during the shutdown period. In this way, the remaining water in the fuel cell stack may, for instance, be concentrated in a selected set of colder flow fields during such period and dealt with appropriately.

As applied to the fuel cell stacks of the present invention, the shutdown method comprises stopping the generation of electricity from the fuel cell stack, allowing the fuel cell stack to cool over a cooldown period, and maintaining a temperature difference between the cathode side and the anode side of each membrane electrode assembly during the cooldown period, such that the direction of the temperature difference in each membrane electrode assembly is the same. That is, either the cathode side is hotter than the anode side in each membrane electrode assembly or vice versa (i.e., the anode side is hotter than the cathode side in each membrane electrode assembly).

In a further more specific embodiment, the method further comprises maintaining substantially the same absolute temperatures and temperature difference within each membrane electrode assembly during the cooldown period (e.g., the cathode side temperature in each membrane electrode assembly is about the same and the anode side temperature in each membrane electrode assembly is about the same). In an alternate embodiment, the method further comprises maintaining a monotonically decreasing temperature across groups of membrane electrode assemblies in the stack during the cooldown period. That is, each group of membrane electrode assemblies has a hot side and a cold side, the temperatures of the membrane electrode assemblies in each group decrease monotonically across the group between the hot side and the cold side during the cooldown period, and the temperatures of, and the temperature difference between, the hot side and the cold side of each group during the cooldown period are substantially the same.

As is apparent in the embodiment of FIG. 4, since the coolant flow field plates 480 are adjacent only to the cathode flow field plates 424, the cathode side in each membrane electrode assembly can be cooled more quickly than each anode side during shutdown. Thus, it is possible to maintain a desired temperature difference in each membrane electrode assembly during shutdown. The embodiment of FIG. 4 is therefore well suited to application of the aforementioned shutdown method.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A fuel cell stack comprising:

a plurality of membrane electrode assemblies, each membrane electrode assembly comprising an anode fluid distribution layer, a cathode fluid distribution layer, a polymer electrolyte membrane interposed between the anode and cathode fluid distribution layers, an anode electrocatalyst layer interposed between the polymer electrolyte membrane and the anode fluid distribution layer, and a cathode electrocatalyst interposed between the polymer electrolyte membrane and the cathode fluid distribution layer, wherein the plurality of membrane electrode assemblies are stacked in an alternating manner such that the polarity of adjacent membrane electrode assemblies are opposite, and wherein the plurality of membrane electrode assemblies are externally jumpered;

a plurality of electrically conductive anode flow field plates arranged such that an anode flow field plate is interposed between opposing faces of adjacent membrane electrode assemblies having facing anode fluid distribution layers;

a plurality of electrically conductive cathode flow field plates arranged such that a pair of cathode flow field plates is interposed between opposing faces of adjacent membrane electrode assemblies having facing cathode fluid distribution layers; and a plurality of electrically insulating coolant flow field plates arranged such that a coolant flow field plate is interposed between each pair of cathode flow field plates interposed between opposing faces of adjacent membrane electrode assemblies having facing cathode fluid distribution layers, such that the fuel cell stack comprises a plurality of repeating units, each repeating unit comprising, in the following order, a first cathode flow field plate, a first membrane electrode assembly, an anode flow field plate, a second membrane electrode assembly and a second cathode flow field plate, and each repeating unit being interposed between two coolant flow field plates.

2. The fuel cell stack of claim 1 wherein the anode flow field plate of each repeating unit is externally jumpered to both the first and second cathode flow field plates of an adjacent repeating unit.

3. The fuel cell stack of claim 1 wherein the average resistance of each of the anode and cathode flow field plates is less than about 50 m-ohms.

4. The fuel cell stack of claim 1 wherein the ratio of formed plate width to average formed plate thickness of each of the anode and cathode flow field plates is less than about 250.

* * * * *